United States Patent [19]

Morin et al.

[11] 4,229,326
[45] Oct. 21, 1980

[54] METHOD FOR PRODUCING GRAFT COPOLYMERS OF CELLULOSE OR PROTEIN FIBER WITH VINYL MONOMERS

[76] Inventors: Boris P. Morin, ulitsa Novatorov, 40, korpus 19, kv. 13; Galina J. Voinova, ulitsa akademika Petrovskogo, 5, kv. 53; Irina P. Breusova, ulitsa Belovezhskaya, 49, kv. 30; Galina I. Stanchenko, ulitsa Molodogvardeiskaya, 24, kv. 101; Zakhar A. Rogovin, ulitsa Donskaya, 24, kv. 68, all of Moscow, U.S.S.R.

[21] Appl. No.: 8,942

[22] Filed: Feb. 2, 1979

[51] Int. Cl.$^3$ .......................... C08L 1/02; C08L 89/00
[52] U.S. Cl. .............................. 260/8; 260/17.4 GC; 260/17.4 SG
[58] Field of Search ............ 260/17.4 GC, 8, 17.4 SG

[56] References Cited

U.S. PATENT DOCUMENTS

| | | | |
|---|---|---|---|
| 4,036,588 | 7/1977 | Williams et al. | 8/130.1 |
| 4,066,583 | 1/1978 | Spaulding | 260/17.4 SG |

FOREIGN PATENT DOCUMENTS 875664  8/1961  United Kingdom ................... 260/17.4

OTHER PUBLICATIONS

C.A. vol. 67: 65621f, Continuous Polymer Deposition on Cellulose, Rose.
C.A. vol. 71: 71782h, Iron Ion Adsorption—Vinyl Monomers, Cremonesi.
C.A. vol. 71: 125,905w, Grafting—Support—Protein Fibers, Habib.
C.A. 83: 29686c, Graft Copolymers—Protein—Vinyl Monomers—Redox System, Butina et al.
C.A. 88: 106619r, Study—Structure—Grafted Cellulose Co-polymers, Morin et al.

*Primary Examiner*—Edward M. Woodberry
*Attorney, Agent, or Firm*—Lackenbach, Lilling & Siegel

[57] ABSTRACT

A method for obtaining graft copolymers of cellulose or protein fiber with vinyl monomers, comprising the steps of impregnating cellulose or protein fiber with an aqueous solution of ferrous salt, removing excessive ions of ferrous iron, and grafting vinyl monomers to cellulose or protein fiber from an aqueous solution, aqueous emulsion or aqueous dispersion of a vinyl monomer, containing hydrogen peroxide and a reducing agent. The latter is hydrazine sulfate, sodium sulfide, glucose, sodium hypophosphite, sodium bitartrate or hydroquinone taken in an amount of 0.002 to 0.02 percent by mass. The method provides for a high rate of graft polymerization and rules out the formation of a free homopolymer in the reaction mixture. It can be carried out as a continuous and batch process.

7 Claims, No Drawings

METHOD FOR PRODUCING GRAFT COPOLYMERS OF CELLULOSE OR PROTEIN FIBER WITH VINYL MONOMERS

FIELD OF THE INVENTION

The present invention relates to methods for producing graft copolymers of cellulose or protein fiber with vinyl monomers. Graft copolymers obtained by this method can be used as raw material for manufacturing different kinds of commodities and protective clothing for workers of the chemical industry. Such copolymers can further be used as ion exchangers for trapping ions of precious and other metals, as well as for purifying sewage, sugar syrup, etc.

BACKGROUND OF THE INVENTION

There is known a method for producing graft copolymers of protein fiber, such as wool or silk, with vinyl monomers, comprising the steps of impregnating the protein fiber with an aqueous solution of ferrous salt, washing off excessive ions of ferrous iron, impregnating the fiber with an aqueous solution of a reducing agent, such as sodium hydrosulfite or dioxide of thiourea, washing off the excessive reducing agent, and grafting vinyl monomers to the protein fiber from an aqueous solution or aqueous emulsion of a vinyl monomer, containing hydrogen peroxide.

The method under review is disadvantageous in that it is carried out as a multistage process resulting in excessive amounts of effluents. Besides, the above-mentioned reducing agents cannot provide for a sufficiently high rate of graft polymerization, which, in turn, does not make it possible to intensify the production of graft copolymers.

There is further known a method for producing graft copolymers of cellulose or protein fiber, such as wool, with vinyl monomers, comprising the steps of impregnating cellulose or protein fiber with an aqueous solution of a mixture of ferrous salt and a reducing agent which is formaldehyde sulfoxylate of sodium, washing off excessive reducing agent and excessive ions of ferrous iron, and grafting vinyl monomers to cellulose or protein fiber from an aqueous solution or aqueous emulsion of a vinyl monomer, containing hydrogen peroxide.

The latter method is disadvantageous in that the reducing agent does not ensure a sufficiently high rate of graft polymerization and thus does not make it possible to intensify the production of graft copolymers; another disadvantage of this method is that it does not provide for continuous production of graft copolymers of cellulose.

SUMMARY OF THE INVENTION

It is an object of the present invention to provide a method for producing graft copolymers of cellulose or protein fiber with vinyl monomers, which would make it possible to considerably increase the rate of graft polymerization and thus substantially intensify the production of graft copolymers, as well as carry out continuous production of copolymers of cellulose.

To the accomplishment of the foregoing and other ends, the present invention essentially consists in providing a method for producing graft copolymers of cellulose or protein fiber with vinyl monomers, comprising the steps of impregnating cellulose or protein fiber with an aqueous solution of ferrous salt, removing excessive ions of ferrous iron, and grafting vinyl monomers to cellulose or protein fiber from an aqueous solution, aqueous emulsion or aqueous dispersion of a vinyl monomer, containing hydrogen peroxide, the method being characterized, according to the invention, in that the graft polymerization is preceded by adding a reducing agent to the aqueous solution, aqueous emulsion or aqueous dispersion of the vinyl monomer, the reducing agent being selected from the group consisting of hydrazine sulfate, sodium sulfide, glucose, sodium hypophosphite, sodium bitartrate or hydroquinone and taken in an amount of 0.002 to 0.02 percent by mass.

The above reducing agents considerably increase the rate of grafting vinyl monomers to cellulose or protein fiber and rule out the formation of a free homopolymer in the reaction mixture. As a result, it is possible to considerably intensify the production of graft copolymers and carry out the production of graft copolymers of cellulose as a continuous process.

DETAILED DESCRIPTION OF THE INVENTION

According to the invention, cellulose is used in the form of viscose fiber (thread, fiber bundle or staple), as well as cotton and wood pulp.

The protein fiber is wool or silk fiber.

The vinyl monomers are selected from the group consisting of 2-methyl-5-vinylpyridine, 4-vinylpyridine, 2-methyl-4-vinylpyridine, acrylonitrile, styrene and methyl methacrylate.

The reducing agent is selected from the group consisting of hydrazine sulfate, sodium sulfide, glucose, sodium hypophosphite, sodium bitartrate or hydroquinone.

The emulsifier is a non-ionogenic emulsifier of this type:

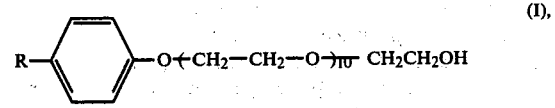

where R is alkyl $C_8$–$C_{10}$, or an ionogenic emulsifier of this type:

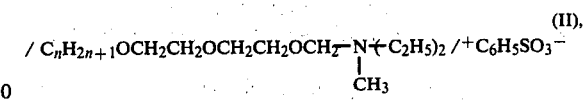

where n=14–17, or of this type:

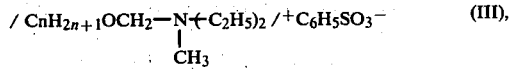

where n=10–16.

The method of this invention can be carried out as both a batch and continuous process.

In the former case, cellulose in the form of staple viscose fiber, cotton or wood pulp, or protein fiber, such as wool or silk, is impregnated with a 0.05- to 0.25-percent solution of ferrous salt. This is followed by removing excessive ions of ferrous iron, for example, by washing them off with water. The cellulose or protein fiber is placed in a pressure-dyeing apparatus, and an aqueous solution, aqueous emulsion or aqueous dispersion of a vinyl monomer, containing hydrogen peroxide and a reducing agent, is added thereto. The concentration of the reducing agent in the aqueous solution, aqueous emulsion or aqueous dispersion is 0.002 to 0.02 percent by mass. Vinyl monomers, hydrogen peroxide and the emulsifier are used in normally accepted quantities, i.e. the concentration of vinyl monomers is 1 to 10 percent by mass; that of hydrogen peroxide is 0.01 to 0.1 percent by mass; and that of the emulsifier is 0.2 to 1 percent by mass. Graft polymerization is carried out at a temperature of 0° to 80° C. The process being over, the spent reaction mixture is discharged, and the product of polymerization is washed with water or acetic acid having a concentration of 1 to 2 percent, and dried.

In the case of continuous production, freshly formed viscose fiber is continuously passed through a bath containing a 0.05- to 0.25-percent solution of ferrous salt, whereupon excessive ions of ferrous iron are removed, for example, by passing the fiber between squeezing rollers. The fiber is then passed through a bath with an aqueous solution, aqueous emulsion or aqueous dispersion of a vinyl monomer, containing hydrogen peroxide and a reducing agent, or an emulsifier if an emulsion is used. The end product obtained at the outlet of the bath is a graft copolymer of cellulose and the vinyl monomer. The end product is washed, dried and either spooled or cut to produce staple fiber.

A better understanding of the present invention will be had from a consideration of the following examples illustrating preferred embodiments thereof.

EXAMPLE 1

100 g of staple Viscose fiber is impregnated with a 0.25-percent aqueous solution of Mohr's salt, i.e. $(NH_4)_2SO_4.FeSO_4.6H_2O$. This is done for 15 minutes at 20° C. The bath ratio, i.e. the ratio between the mass of the cellulose and that of the liquid phase, is 50, and pH=4.5 to 5.5. Excessive ions of ferrous iron are then washed off with distilled water, whereupon the fiber is squeezed and placed in a 7-percent aqueous solution of acrylonitrile containing 0.06 percent by mass of hydrogen peroxide and 0.003 percent by mass of hydrazine sulfate. The graft polymerization is carried out for 15 minutes at a temperature of 60° C. and a bath ratio of 50. The graft polymer thus produced is washed with water and dried to constant weight. The amount of graft polyacrylonitrile is 70 percent of the mass of the initial fiber.

For comparison, a graft copolymer of cellulose and acrylonitrile is produced as described above, only this time the aqueous solution of the monomer contains 0.003 percent by mass of formaldehyde sulfoxylate of sodium instead of hydrazine sulfate. The amount of graft polyacrylonitrile is 23 percent of the mass of the initial fiber, and 45 to 50 percent of free homopolymer is produced in the reaction mixture due to the conversion of the monomer.

Also for comparison, a graft copolymer of cellulose and acrylonitrile is produced according to the known method, whereby viscose fiber is impregnated with an aqueous solution containing 0.25 percent by mass of Mohr's salt and 0.7 percent by mass of formaldehyde sulfoxylate of sodium. Excessive formaldehyde sulfoxylate of sodium and excessive ions of ferrous iron are washed off with water, whereupon the fiber is squeezed and graft polymerization is carried out under the conditions of Example 1, but without adding a reducing agent to the monomer solution. The amount of graft polyacrylonitrile is 30 percent of the mass of the initial fiber.

EXAMPLE 2

100 g of wool fiber is impregnated with a 0.05-percent aqueous solution of Mohr's salt for 15 minutes at a temperature of 22° to 25° C. The bath ratio is 50, and pH=4.5 to 5.5. Excessive ions of ferrous iron are washed off with water, the fiber is squeezed and placed in a 6-percent aqueous solution of acrylonitrile containing 0.03 percent of hydrogen peroxide and 0.005 percent of hydrazine sulfate. Graft polymerization is carried out for 30 minutes at a temperature of 60° C. The graft copolymer thus produced is washed with water and dried to constant weight. The amount of graft polyacrylonitrile is 40 percent of the mass of the initial fiber.

For comparison, a graft copolymer of wool fiber and acrylonitrile is produced according to the known method, whereby wool fiber is impregnated with an aqueous solution containing 0.05 percent of Mohr's salt and 0.14 percent of formaldehyde sulfoxylate of sodium. The fiber is washed with water, squeezed, and graft polymerization is carried out under the conditions of Example 2, but without adding a reducing agent to the aqueous solution of the monomer. The amount of graft polyacrylonitrile is 25 percent of the mass of the initial fiber.

Also for comparison, a graft copolymer of wool fiber and acrylonitrile is produced as described in Example 2, but this time 0.005 percent of sodium hydrosulfite is added to the aqueous solution of the monomer instead of hydrazine sulfate. The amount of graft polyacrylonitrile is 18 percent of the mass of the initial fiber, and 40 percent of free homopolymer is produced in the reaction mixture due to the conversion of the monomer.

EXAMPLE 3

100 g of staple viscose fiber is treated as in Example 1, and graft polymerization is carried out by using a 7-percent aqueous solution of acrylonitrile containing 0.05 percent of hydrogen peroxide and 0.003 percent of sodium sulfide. Graft polymerization is carried out for 20 minutes at a temperature of 60° C. The amount of graft polyacrylonitrile is 60 percent of the mass of the initial fiber.

For comparison, a graft copolymer of cellulose and acrylonitrile is produced according to the known method, whereby staple viscose fiber is impregnated with an aqueous solution containing 0.25 percent of Mohr's salt and 0.6 percent by mass of formaldehyde sulfoxylate of sodium. Excessive formaldehyde sulfoxylate of sodium and excessive ions of ferrous iron are washed off with water, the fiber is squeezed, and graft polymerization is carried out under the conditions described in Example 3, but without adding a reducing agent to the aqueous solution of the monomer. The amount of graft polyacrylonitrile is 34 percent of the mass of the initial fiber.

Also for comparison, a graft copolymer of cellulose and acrylonitrile is produced as described in Example 3, but this time graft polymerization is carried out with the use of an aqueous monomer solution without sodium sulfide. The amount of graft polyacrylonitrile is 25 percent of the mass of the initial fiber.

EXAMPLE 4

100 g of wool fiber is treated as in Example 2, and graft polymerization is carried out by using a 2-percent aqueous emulsion of styrene containing 0.03 percent of hydrogen peroxide, 0.005 percent of sodium sulfide and 0.2 percent of the emulsifier of formula (II). Graft polymerization is carried out for 20 minutes at a temperature of 70° C. The amount of graft polystyrene is 60 percent of the mass of the initial fiber.

For comparison, a graft copolymer of wool fiber and styrene is produced according to the known method, whereby wool fiber is impregnated with a 0.05-percent aqueous solution of Mohr's salt, whereupon excessive ions of ferrous iron are removed. The fiber is then impregnated with a 0.6-percent aqueous solution of thiourea dioxide, whereupon excessive thiourea dioxide is removed and the fiber is squeezed. Graft polymerization is carried out as in Example 4, but this time no reducing agent is added to the aqueous emulsion of the monomer. The amount of graft polystyrene is 27 percent of the mass of the initial fiber.

Also for comparison, a graft copolymer of wool fiber and styrene is produced as described in Example 4, but this time the aqueous emulsion of the monomer contains no sodium sulfide. The amount of graft polystyrene is 25 percent of the mass of the initial fiber.

EXAMPLE 5

100 g of cotton is impregnated with a 0.25-percent aqueous solution of $FeSO_4$ for 15 minutes at a temperature of 22° to 25° C. Excessive ions of ferrous iron are washed off with distilled water, the fiber is squeezed out and placed in a 10-percent aqueous dispersion of acrylonitrile containing 0.06 percent of hydrogen peroxide and 0.01 percent of glucose. Graft polymerization is carried out for 20 minutes at a temperature of 60° C. The amount of graft polyacrylonitrile is 78 percent of the mass of cotton.

For comparison, a graft copolymer of cellulose and acrylonitrile is produced according to the known method, whereby cotton is impregnated with an aqueous solution containing 0.25 percent of Mohr's salt and 0.7 percent of formaldehyde sulfoxylate of sodium. Excessive formaldehyde sulfoxylate of sodium and excessive ions of ferrous iron are washed off with water, the fiber is squeezed out, and polymerization is carried out under the conditions of Example 5, but without adding a reducing agent to the aqueous dispersion of the monomer. The amount of graft polymer is 32 percent of the mass of cotton.

Also for comparison, a graft copolymer of cellulose and acrylonitrile is produced as described in Example 5, but this time the aqueous dispersion of the monomer contains no glucose. The amount of graft polymer is 25 percent of the mass of cotton.

EXAMPLE 6

100 g of staple viscose fiber is treated as described in Example 1. Graft polymerization is carried out by using 1-percent aqueous emulsion of styrene containing 0.03 percent of hydrogen peroxide, 0.002 percent of sodium hypophosphite and 0.4 percent of the emulsifier of formula (II). Graft polymerization is carried out for 30 minutes at a temperature of 70° C. The amount of graft polystyrene is 35 percent of the mass of the initial fiber.

For comparison, a graft copolymer of cellulose and styrene is produced according to the known method, whereby staple viscose fiber is impregnated with an aqueous solution containing 0.25 percent of Mohr's salt and 0.7 percent of formaldehyde sulfoxylate of sodium. The fiber is then washed with water and squeezed out. Graft polymerization is carried out under the conditions of Example 6, but without adding a reducing agent to the solution of the monomer. The amount of graft polystyrene is 22 percent of the mass of the initial fiber.

Also for comparison, a graft copolymer of cellulose and styrene is produced as described in Example 6, but this time the aqueous emulsion of the monomer contains no sodium hypophosphite. The amount of graft polystyrene is 17 percent of the mass of the initial fiber.

EXAMPLE 7

100 g of wool fiber is impregnated with a 0.05-percent aqueous solution of $FeSO_4$ for 15 minutes at a temperature of 20° C. Excessive ions of ferrous iron are washed off with distilled water, the fiber is squeezed out and placed in a 7-percent aqueous solution of acrylonitrile containing 0.03 percent of hydrogen peroxide and 0.01 percent of sodium bitartrate. Graft polymerization is carried out for 30 minutes at a temperature of 60° C. The amount of graft polyacrylonitrile is 50 percent of the mass of the initial fiber.

For comparison, a graft copolymer of wool fiber and acrylonitrile is produced under the conditions described above, but this time 0.01 percent of formaldehyde sulfoxylate of sodium is added to the aqueous solution of the monomer instead of sodium bitartrate. The amount of graft polyacrylonitrile is 22 percent of the mass of the initial fiber, and 45 percent of free homopolymer is produced in the reaction mixture due to the conversion of the monomer.

Also for comparison, a graft copolymer of wool fiber and acrylonitrile is produced according to the known method, whereby wool fiber is impregnated with a 0.05-percent aqueous solution of Mohr's salt. Excessive ions of ferrous iron are washed off, and the fiber is impregnated with a 0.5-percent aqueous solution of thiourea dioxide. Excessive thiourea dioxide is then washed off, and the fiber is squeezed out. Graft polymerization is carried out as described in Example 7, but no reducing agent is added to the aqueous solution of the monomer. The amount of graft polyacrylonitrile is 26 percent of the mass of the initial fiber.

EXAMPLE 8

100 g of staple viscose fiber is treated as in Example 1, and graft polymerization is carried out with the use of a 7-percent aqueous solution of acrylonitrile containing 0.03 percent of hydrogen peroxide and 0.002 percent of hydroquinone for 20 minutes at a temperature of 60° C. The amount of graft polyacrylonitrile is 50 percent of the mass of the initial fiber.

For comparison, a graft copolymer of cellulose and acrylonitrile is produced under the above conditions, but this time the aqueous solution of the monomer contains no hydroquinone. The amount of graft polyacrylonitrile is 20 percent of the mass of the initial fiber.

EXAMPLE 9

100 g of staple viscose fiber is treated as in Example 1, and graft polymerization is carried out by using a 7-percent aqueous emulsion of 2-methyl-5-vinylpyridine containing 0.06 percent of hydrogen peroxide, 0.006 percent of hydrazine sulfate and 1 percent of the emulsifier of formula (I). The graft polymerization is carried out for 20 minutes at a temperature of 70° C. The amount of graft poly-2-methyl-5-vinylpyridine is 120 percent of the mass of the initial fiber.

For comparison, a graft copolymer of cellulose and 2-methyl-5-vinylpyridine is produced according to the known method, whereby staple viscose fiber is impregnated with an aqueous solution containing 0.25 percent of Mohr's salt and 0.7 percent of formaldehyde sulfoxylate of sodium. The fiber is then washed with water and squeezed out. Graft polymerization is carried out under the conditions of Example 9, but without adding a reducing agent to the aqueous solution of the monomer. The amount of graft polymer is 24 percent of the mass of the initial fiber.

EXAMPLE 10

100 g of staple viscose fiber is treated as in Example 1, and graft polymerization is carried out with the use of an 8-percent aqueous emulsion of 4-vinylpyridine containing 0.03 percent of hydrogen peroxide, 0.005 percent of hydrazine sulfate and 0.5 percent of the emulsifier of formula (I). Graft polymerization is carried out for 30 minutes at a temperature of 80° C. The amount of graft poly-4-vinylpyridine is 110 percent of the mass of the initial fiber.

For comparison, a graft copolymer of cellulose and 4-vinylpyridine is produced according to the known method, whereby staple viscose fiber is impregnated with an aqueous solution containing 0.25 percent of Mohr's salt and 0.7 percent of formaldehyde sulfoxylate of sodium. The fiber is then washed with water and squeezed out. Graft polymerization is carried out under the conditions of Example 10, but without adding a reducing agent to the aqueous emulsion of the monomer. The amount of graft polymer is 30 percent of the mass of the initial fiber.

EXAMPLE 11

100 g of staple viscose fiber is treated as in Example 1. Graft polymerization is carried out by using a 7-percent aqueous emulsion of 2-methyl-4-vinylpyridine containing 0.02 percent of hydrogen peroxide, 0.004 percent of hydrazine sulfate and 0.2 percent of the emulsifier of formula (I). Graft polymerization is carried out for 30 minutes at a temperature of 80° C. The amount of graft poly-2-methyl-4-vinylpyridine is 105 percent of the mass of the initial fiber.

For comparison, a graft copolymer of cellulose and 2-methyl-4-vinylpyridine is produced according to the known method, whereby staple viscose fiber is impregnated with an aqueous solution containing 0.25 percent of Mohr's salt and 0.7 percent of formaldehyde sulfoxylate of sodium. The fiber is then washed with water and squeezed out. Graft polymerization is carried out under the conditions described in Example 11, but without adding a reducing agent to the aqueous emulsion of the monomer. The amount of graft polymer is 25 percent of the mass of the initial fiber.

EXAMPLE 12

100 g of staple viscose fiber is treated as in Example 1, and graft polymerization is carried out by using a 7-percent aqueous solution of acrylonitrile containing 0.01 percent of hydrogen peroxide and 0.02 percent of hydroquinone. Graft polymerization is carried out for one hour at a temperature of 0° C. The amount of graft polyacrylonitrile is 30 percent of the mass of the initial fiber.

For comparison, there was made an attempt to produce a graft copolymer of cellulose and acrylonitrile according to the known method, whereby staple viscose fiber was impregnated with an aqueous solution containing 0.25 percent of Mohr's salt and 0.7 percent of formaldehyde sulfoxylate of sodium. The fiber was washed with water and squeezed out. Graft polymerization was attempted under the conditions of Example 12, but without adding a reducing agent to the aqueous solution of the monomer. However, no polymerization took place, which means that the amount of graft polymer was 0%.

For comparison, an attempt was made to produce a graft copolymer of cellulose and acrylonitrile under the conditions of Example 12, but without hydroquinone in the aqueous solution of the monomer. The amount of graft polymer was 0%.

EXAMPLE 13

A graft copolymer of cellulose and acrylonitrile is produced as described in Example 12, but graft polymerization is carried out for 30 minutes at a temperature of 10° C. The amount of graft polyacrylonitrile is 32 percent of the mass of the initial fiber.

For comparison, it was attempted to produce a graft copolymer of cellulose and acrylonitrile under the conditions stated in Example 12, but with graft polymerization carried out at a temperature of 10° C. No graft polymerization took place, so the amount of graft polymer was 0%.

EXAMPLE 14

A graft copolymer of cellulose and acrylonitrile is produced according to the method of this invention as described in Example 12, but graft polymerization is carried out for 30 minutes at a temperature of 40° C. The amount of graft polyacrylonitrile is 85 percent of the mass of the initial fiber.

For comparison, a graft copolymer of cellulose and acrylonitrile is produced according to the known method, whereby staple viscose fiber is impregnated with an aqueous solution containing 0.25 percent of Mohr's salt and 0.7 percent of formaldehyde sylfoxylate of sodium. The fiber is then washed with water and squeezed out. Graft polymerization is carried out under the conditions of Example 14, but without adding a reducing agent to the aqueous solution of the monomer. The amount of graft polyacrylonitrile is 18 percent of the mass of the initial fiber.

EXAMPLE 15

100 g of silk fiber is impregnated with a 0.005-percent aqueous solution of Mohr's salt for 30 minutes at a temperature of 20° to 22° C. Excessive ions of ferrous iron are then washed off with water, the fiber is squeezed out and placed in a 7-percent aqueous solution of acrylonitrile containing 0.02 percent of hydrogen peroxide and 0.02 percent of glucose. Graft polymerization is carried out for 30 minutes at a temperature of 60° C. The graft copolymer thus produced is washed with water and dried to constant weight. The amount of graft polyacrylonitrile is 35 percent of the mass of the initial silk fiber.

For comparison, a graft copolymer of silk fiber and acrylonitrile is produced according to the known method, whereby silk fiber is impregnated with a 0.05-percent aqueous solution of Mohr's salt, whereupon excessive ions of ferrous iron are washed off. The fiber is then impregnated with a 0.5-percent aqueous solution of sodium hydrosulfite, whereupon excessive sodium hydrosulfite is washed off and the fiber is squeezed out. Graft polymerization is carried out as in Example 15, but no reducing agent is added to the aqueous solution of the monomer. The amount of graft polyacrylonitrile is 15 percent of the mass of the initial fiber.

EXAMPLE 16

100 g of silk fiber is treated as described in Example 15. Graft polymerization is carried out by using a 1-percent aqueous emulsion of methyl methacrylate containing 0.02 percent of hydrogen peroxide, 0.02 percent of sodium hypophosphite and 0.5 percent of the emulsifier of formula (III). Graft polymerization is carried out for 30 minutes at a temperature of 60° C. The amount of graft polymethyl methacrylate is 36 percent of the mass of the initial fiber.

For comparison, a graft copolymer of silk fiber and methyl methacrylate is produced according to the known method, whereby silk fiber is impregnated with a 0.05-percent aqueous solution of Mohr's salt, whereupon excessive ions of ferrous iron are washed off. The fiber is then impregnated with a 0.6-percent aqueous solution of thiourea dioxide, whereupon excessive thiourea dioxide is washed off and the fiber is squeezed out. Graft polymerization is carried out as described in Example 16, but without adding a reducing agent to the aqueous emulsion of the monomer. The amount of graft polymethyl methacrylate is 10 percent of the mass of the initial fiber.

EXAMPLE 17

100 g of woodpulp cellulose is treated as described in Example 15. Graft polymerization is carried out by using a 7-percent aqueous emulsion of 2-methyl-5-vinylpyridine containing 0.06 percent of hydrogen peroxide, 0.01 percent of hydrazine sulfate and 0.6 percent of the emulsifier of formula (III). Graft polymerization is carried out for 30 minutes at a temperature of 70° C. The amount of graft poly-2-methyl-5-vinylpyridine is 115 percent of the mass of the initial fiber.

For comparison, a graft copolymer of cellulose and 2-methyl-5-vinylpyridine is produced according to the known method, whereby woodpulp cellulose is impregnated with an aqueous solution containing 0.25 percent of Mohr's salt and 0.7 percent of formaldehyde sulfoxylate of sodium. The fiber is then washed with water and squeezed out. Graft polymerization is carried out under the conditions of Example 17, but without adding a reducing agent to the aqueous emulsion of the monomer. The amount of graft poly-2-methyl-5-vinylpyridine is 25 percent of the mass of the initial fiber.

EXAMPLE 18

Freshly formed viscose fiber (thread or bundle) is continuously passed through a bath containing a 0.05-percent aqueous solution of Mohr's salt maintained at a temperature of 20° to 25° C. Excessive ions of ferrous iron are removed by passing the fiber between squeezing rollers. The fiber is then passed through a bath with a 6-percent aqueous solution of acrylonitrile containing 0.03 percent of hydrogen peroxide and 0.003 percent of hydroquinone. Graft polymerization is carried out at a temperature of 60° C., the fiber being kept in the bath with the monomer solution for one minute. The fiber that leaves the bath is a graft copolymer of cellulose and acrylonitrile. This product is squeezed out, and unreacted acrylonitrile is removed from the fiber by live steam. The product is then washed with water, spooled and dried. The amount of graft polyacrylonitrile is 32 percent of the mass of the initial fiber.

An attempt to produce a graft copolymer of cellulose and acrylonitrile as a continuous process carried out according to the known method, i.e. with the use of conventional reducing agents, was a failure, since the continuous process leaves too little time for graft polymerization to take place.

EXAMPLE 19

A graft copolymer of cellulose and acrylonitrile is produced as described in Example 18, but this time use is made of a 6-percent aqueous solution of acrylonitrile containing 0.006 percent of hydrazine sulfate and 0.04 percent of hydrogen peroxide. The amount of graft polyacrylonitrile is 35 percent of the mass of the initial fiber.

EXAMPLE 20

A graft copolymer of cellulose and acrylonitrile is produced as described in Example 18, but this time use is made of a 6-percent aqueous solution of acrylonitrile containing 0.008 percent of sodium sulfide and 0.05 percent of hydrogen peroxide. The amount of graft polymer is 29 percent of the mass of the initial fiber.

EXAMPLE 21

Freshly formed viscose fiber (thread or bundle) is continuously passed through a bath containing a 0.1-percent aqueous solution of Mohr's salt maintained at a temperature of 20° to 25° C. Excessive ions of ferrous iron are removed by passing the fiber through squeezing rollers. The fiber is then passed through a bath with a 7-percent aqueous emulsion of 2-methyl-5-vinylpyridine containing 0.06 percent of hydrogen peroxide, 0.015 percent of hydrazine sulfate and 0.5 percent of the emulsifier of formula (II). Graft polymerization is carried out at a temperature of 70° C. with the fiber being kept in the bath with the monomer emulsion for 1.5 minute. The fiber that leaves the bath is a graft copolymer of cellulose and 2-methyl-5-vinylpyridine which is squeezed out, washed, spooled or cut to produce staple fiber. The amount of graft poly-2-methyl-5-vinylpyridine is 42 percent of the mass of the initial fiber.

What is claimed is:

1. A method for producing graft copolymers of a natural polymer, selected from the group consisting of cellulose and protein fibers, with vinyl monomers, comprising the steps of impregnating the natural polymer selected from the group consisting of cellulose and protein fibers with an aqueous solution of ferrous salt, removing excessive ions of ferrous iron, and grafting vinyl monomers to said natural polymer from an aqueous solution, aqueous emulsion or aqueous dispersion of a vinyl monomer, containing hydrogen peroxide and a reducing agent which is selected from the group consisting of sodium sulfide, glucose, sodium hypophosphite, sodium bitartrate and hydroquinone, and used in an amount of 0.002 to 0.02 percent by mass.

2. The method of claim 1, wherein said reducing agent is sodium sulfide.

3. The method of claim 1, wherein said reducing agent is glucose.

4. The method of claim 1, wherein said reducing agent is sodium hypophosphite.

5. The method of claim 1, wherein said reducting agent is sodium bitartrate.

6. The method of claim 1, wherein said reducing agent is hydroquinone.

7. The method of claim 1, wherein the concentration of vinyl monomers is 1–10 percent by weight, the concentration of hydrogen peroxide is 0.01 to 0.1 percent by weight, and the concentration of the emulsifier is 0.2 to 1 percent by weight, and the graft polymerization is carried out at a temperature of 0° to 80° C.

* * * * *